(12) United States Patent
Singhal et al.

(10) Patent No.: US 10,284,440 B2
(45) Date of Patent: *May 7, 2019

(54) REAL-TIME ADAPTIVE PROCESSING OF NETWORK DATA PACKETS FOR ANALYSIS

(71) Applicant: NetScout Systems, Inc., Westford, MA (US)

(72) Inventors: Anil K. Singhal, Carlisle, MA (US); Bruce A. Kelley, Jr., Westford, MA (US); Rajeev Nadkarni, Chelmsford, MA (US); Narendra Byrapuram, Lowell, MA (US); Abhishek Saraswati, Santa Clara, CA (US); Ashwani Singhal, Andover, MA (US)

(73) Assignee: NetScout Systems, Inc, Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/603,034

(22) Filed: May 23, 2017

(65) Prior Publication Data

US 2017/0264506 A1 Sep. 14, 2017

Related U.S. Application Data

(63) Continuation of application No. 14/876,725, filed on Oct. 6, 2015, now Pat. No. 9,686,157, which is a
(Continued)

(51) Int. Cl.
- *H04L 12/26* (2006.01)
- *H04L 12/24* (2006.01)
- *H04L 29/06* (2006.01)

(52) U.S. Cl.
CPC ......... *H04L 43/028* (2013.01); *H04L 41/069* (2013.01); *H04L 43/026* (2013.01);
(Continued)

(58) Field of Classification Search
CPC .............. H04L 43/02–43/0894; H04L 69/22
See application file for complete search history.

(56) References Cited

U.S. PATENT DOCUMENTS

| 5,101,402 A | 3/1992 | Chiu et al. |
| 2004/0215770 A1 | 10/2004 | Maher et al. |

(Continued)

OTHER PUBLICATIONS

International Search Report and Written Opinion for PCT Application No. PCT/US2011/024250, dated Apr. 7, 2011.

(Continued)

*Primary Examiner* — Pao Sinkantarakorn
(74) *Attorney, Agent, or Firm* — Locke Lord LLP; Scott D. Wofsy; Christopher J. Capelli

(57) ABSTRACT

A network monitoring system that summarizes a plurality of data packets of a session into a compact session record for storage and processing. Each session record may be produced in real-time and made available during the session and/or after the termination of the session. Depending on protocols, a network monitoring system extracts different sets of information, removes redundant information from the plurality of data packets, and adds performance information to produce the session record. The network monitoring system may retrieve and process a single session record or multiple session records for the same or different protocols to determine cause of events, resolve issues in a network or evaluate network performance or conditions. The session record enables analysis in the units of session instead of individual packets. Hence, the network monitoring system can analyze events, issues or performance of the network more efficiently and effectively.

18 Claims, 7 Drawing Sheets

Related U.S. Application Data continuation of application No. 14/051,301, filed on Oct. 10, 2013, now Pat. No. 9,185,014, which is a continuation of application No. 12/756,638, filed on Apr. 8, 2010, now Pat. No. 8,582,454.

(52) U.S. Cl.
CPC ............ *H04L 43/062* (2013.01); *H04L 43/08* (2013.01); *H04L 69/22* (2013.01); *H04L 43/087* (2013.01); *H04L 43/0829* (2013.01); *H04L 43/0882* (2013.01); *H04L 43/16* (2013.01); *Y02D 50/30* (2018.01)

(56) References Cited

U.S. PATENT DOCUMENTS

| | | |
|---|---|---|
| 2006/0215697 A1 | 9/2006 | Olderdissen |
| 2006/0271823 A1 | 11/2006 | Smith |
| 2007/0140131 A1 | 6/2007 | Malloy et al. |
| 2008/0080495 A1 | 4/2008 | Barrett et al. |
| 2008/0281968 A1 | 11/2008 | Rodriguez |
| 2009/0232016 A1 | 9/2009 | Pruthi et al. |

OTHER PUBLICATIONS

Extended European Search Report for European Application No. EP11766300.5, dated Jun. 24, 2014.
Examination Report from the European Patent Office for European Patent Application No. EP11766300.5, dated Apr. 7, 2015.
Office Action from the U.S. Patent and Trademark Office for U.S. Appl. No. 12/756,638, dated Nov. 29, 2012.
Office Action from the U.S. Patent and Trademark Office for U.S. Appl. No. 12/756,638, dated Jun. 11, 2012.
Office Action from the U.S. Patent and Trademark Office for U.S. Appl. No. 14/051,301, dated May 6, 2015.
Office Action from the U.S. Patent and Trademark Office for U.S. Appl. No. 14/051,301, dated Aug. 5, 2015.

REAL-TIME ADAPTIVE PROCESSING OF NETWORK DATA PACKETS FOR ANALYSIS

CROSS-REFERENCE TO RELATED APPLICATIONS

This application is a Continuation of U.S. patent application Ser. No. 14/876,725 filed on Oct. 6, 2015, which is a continuation of U.S. patent application Ser. No. 14/051,301 filed on Oct. 10, 2013, which is a continuation of U.S. patent application Ser. No. 12/756,638 filed on Apr. 8, 2010, all of which are incorporated herein by reference in their entirety.

FIELD OF THE INVENTION

The present invention is related to monitoring data packets transmitted over a network, more specifically to processing data packets communicated over the network for troubleshooting, analysis and performance evaluation.

BACKGROUND OF THE INVENTION

Today's computer networks are extremely complex, with hundreds or more of applications, thousands or more of servers, hundreds or more of locations, hundreds of thousands of clients, and network traffic routed by numerous switches and routers on the computer networks. Network and application data collected from various parts of the network can provide insight into network conditions, but the enormous amount of data present a challenge for data storage, processing, and retrieval.

Many conventional network monitoring systems store data packets in storage devices on a first-in-first-out (FIFO) basis. These network monitoring systems store the data packets in the storage devices upon receipt. When operations such as analyzing network conditions or performance are called for, the data packets stored in the storage devices are retrieved and then analyzed. However, the network monitoring systems have limited storage capacity. Hence, the network monitoring systems can store data packets captured within a limited time frame. As data rate increases, the network monitoring systems can store data packets spanning over a shorter amount of time. The shorter retention of data packets may result in incomplete or inaccurate analysis. To store data packets for a longer time, the network monitoring systems must be equipped with more storage resources.

Moreover, various operations may involve extensive manual or automatic processing on the data packets. These operations may involve retrieval and analysis of a large number of data packets, which may take an extensive amount of time before the results of the operations are available. The extensive amount of time for retrieving and processing the data packets may result in belated responses or lost opportunity to detect and resolve issues. To obtain faster results of analysis, the network monitoring systems must be equipped with additional computation resources.

SUMMARY OF THE INVENTION

Embodiments of the present invention provide a session record summarizing a plurality of network data packets of a session. The session records allow various operations (e.g., analysis, troubleshooting or evaluation of a network) to be performed in the units of sessions instead of individual data packets. The number of sessions is smaller than the number of data packets. Hence, operations based on the session records yield results faster than operations based on individual data packets. Each session record also has a smaller size compared to a collective set of data packets in a session. Hence, the session records can be stored longer when storage space is limited.

In one embodiment, a session record is generated from a common header and payload metadata. A common header summarizes information in headers of data packets in a session. The payload metadata includes information derived from payloads of the data packets in the session. The session record for a session is then obtained by assembling the common header and the payload metadata.

In one embodiment, data included in the common header and the payload metadata are determined based on the protocol associated with the session. By adapting the data stored in the common header and the payload metadata, the session records can store relevant information for different protocols.

In one embodiment, the common header and the payload metadata are updated and made available in real-time after receiving data packets for the session from the network or made available after storage. The updated common header and the updated payload metadata may be accessed while the session is active. The real-time generation of the common header and the payload metadata is at least partially enabled by receiving the network data packets directly at primary memory and bypassing access to secondary memory.

In one embodiment, performance parameters representing performance of the network fear transmitting the plurality of the data packets in the session are added to the session record. The performance parameters in the session records may be retrieved and processed to evaluate network performance or conditions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Figure 1:
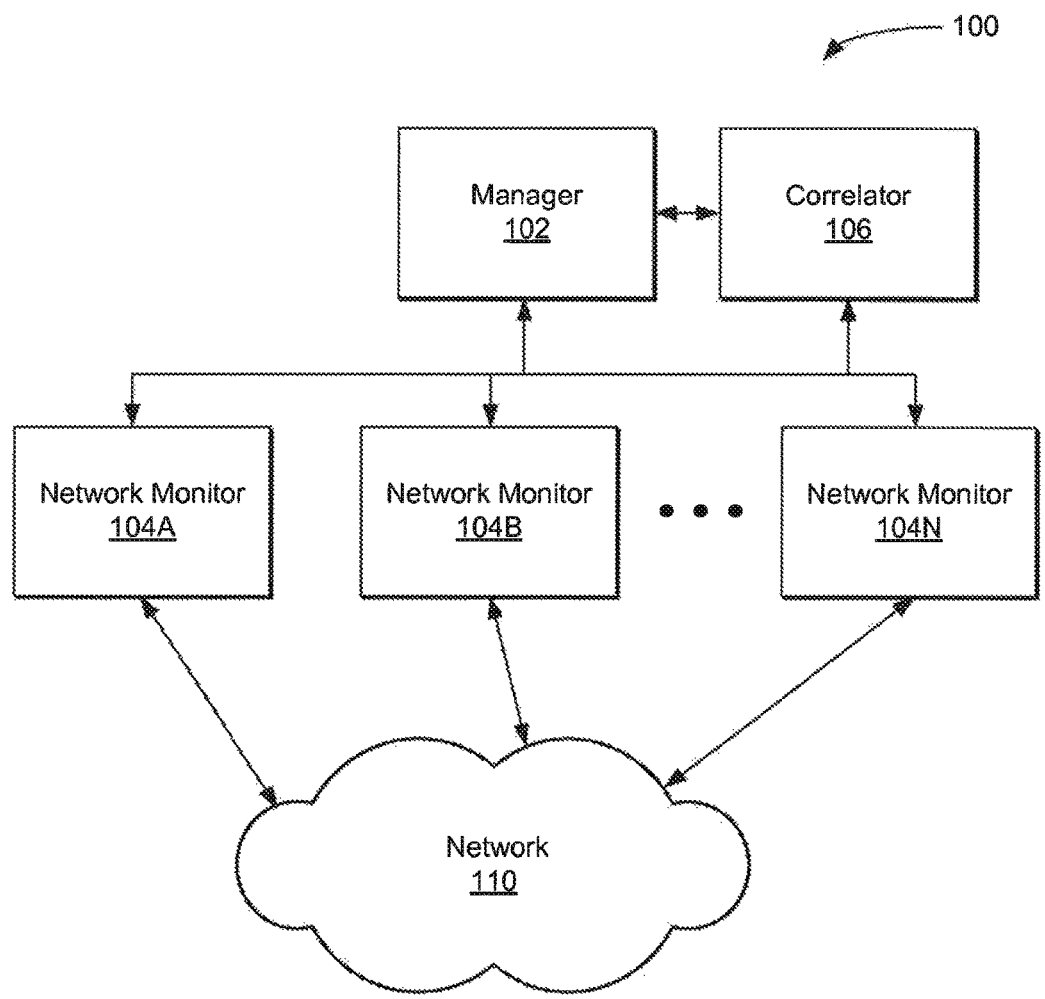
FIG. 1 illustrates the architecture of a system for monitoring network data packets, according to one embodiment of the present invention.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not of the scope of the invention, which is set forth in the following claims.

Embodiments of the present invention relate to summarizing a plurality of data packets of a session into a compact session record for storage and processing. Each session record may be updated in real-time and made available during a session and/or after the termination of the session. Depending on protocols, a network monitoring system extracts different sets of information, removes redundant information from the plurality of data packets, and adds performance metadata to produce the session record. The network monitoring system may retrieve and process a single session record or multiple session records for the same or different protocols to determine a cause of events, resolve issues in a network or evaluate network performance or conditions. The session record enables analysis in the units of session instead of individual packets. Hence, the network monitoring system can more efficiently and effectively analyze events, issues, performance or conditions of the network.

Overview of System Architecture

FIG (Figure). 1 illustrates architecture of a system 100 for monitoring network data packets, according to one embodiment of the present invention. The network system 100 may include, among other components, a manager 102, one or more network monitors 104A through 104N (hereinafter collectively referred to as "the network monitors 104"), a network 110 and a correlator 106. The network monitors 104 are connected to the network 110 to monitor network data packets traversing at certain locations or links of the network 110. The locations or the finks connected to the network monitors 104 are preferably critical or important locations of the network 110.

The manager 102 is connected to the network monitors 104 to set various operating parameters. Although the manager 102 is illustrated as being directly connected to the network monitors 104, the manager 102 may communicate with the network monitors 104 via the network 110 or other networks. The network monitors 104 may be located remotely from the manager 102. Alternatively, the manager 102 may be co-located with one of the network monitors 104 or embodied in one of the network monitors 104.

The operating parameters set by the manager 102 may include, among others, information stored in an adaptive session record (ASR), the format of the ASR, and lengths of time the ASR should be stored. The information stored in the ASR may be set per protocol-by-protocol basis.

The manager 102 is hardware, software, firmware or a combination thereof for managing the operation of the network monitors 104. The manager 102 may perform one or more of the following functions: (i) process information based on ASR or selected network data packets received from the network monitors 104 and the correlator 106, (ii) receive parameters from a user for setting the operation of the network monitors 104, (iii) send commands to the network monitors 104 to set parameters or preferences for their operations, (iv) present the collected information to the user, (v) generate reports concerning conditions and/or performance of the network 110, (vi) analyze packet flows based on information received from the network monitors 104 to resolve issues in the network 110, (vii) provide alarms and alerts on predefined events (e.g., network utilization reaching a limit or detecting critical errors in the network 110), and (viii) provide information about user experience associated with the network 110 (e.g., application or network response time.

The manager 102 may be embodied as a general purpose computing device installed with specialized software for performing one or more of these operations. Alternatively, the manger 102 is embodied as a specialized computing device. In one embodiment, the manager 102 is a computing device running nGenius Performance Manager, available from NetScout Systems, Inc. of Westford, Mass.

In one embodiment, the manager 102 receives ASRs or selectively accesses ASRs from the network monitors 104, analyzes or correlates the ASRs, and produces multi-source information useful for diagnosis of the network 110 and other purposes. The manager 102 may include a correlator module similar to or the same as an inter-protocol correlator, described below in detail with reference to FIG. 3. The multi-source information is obtained by processing ASRs from multiple source network monitors 104, and hence, may represent overall condition or state of the network 110 or a subset of the network 110. The correlator module maps sessions of the same protocol or different protocols based on one or more of the session information 364 and the intra-protocol mapping information 326 based on ASRs or other information received from the network monitors 104. The manager 102 may also support data packet retrieval function that allows its user to identify and retrieve one or more selected data packets from the network monitors 104.

The correlation of ASRs or other information may require extensive resources. In one embodiment, therefore, a correlator 106 separate from the manager 102 may be provided to perform correlation. The correlator 106 may co-exist on the same hardware as the manager 102 or be included in hardware separate from the manager 102. The correlator 106 may be located in the same geographical area as the manager 102 or at a location remote from the manager 102. Further, more than one correlator 106 may be connected to correlate ASRs or other information received from a subset of network monitors. The correlator 106 may be connected to the manager 102 to assist in further analysis, correlation and/or presentation to its user. The correlator 106 may be embodied, for example, as a network apparatus disclosed in U.S. patent application Ser. No. 10/043,501, entitled "Multi-Segment Network Application Monitoring and Correlation Architecture," filed on Jan. 10, 2002, which is incorporated by reference herein in its entirety.

The network monitors 104 are hardware, software, firmware or a combination thereof for monitoring data communication at various locations or links of the network 110. Each of the network monitors 104 may be deployed at certain locations or links of the network 110 to collect network data packets traversing the locations or links.

After collecting the network data packets, the network monitors 104 generate ASRs based on the received network data packets, and stores the ASRs, as described below in detail with reference to FIGS. 5A through 5C. In one embodiment, the ASRs are generated in real-time and sent to the manager 102 and/or the correlator 106. In another embodiment, the ASRs are stored as a file in the network monitors 104 and then sent to the manager 102 and/or the correlator 106 at a later time. The network monitors 104 may also store the network data packets in addition to the ASRs. An ASR has a smaller size compared to the corresponding collection of network data packets. In one embodiment, the ASRs are retained in the network monitor 104 for a longer time compared to the network data packets.

The network monitor 104 may be a special purpose computing device or a software component (not limited to a single process) dedicated to monitoring data communicated via the network 110. Alternatively, the network monitor 104 may be a general purpose computing device with specialized software components installed thereon. In one embodiment, the network monitor 104 is embodied as nGenius Collectors, nGenius Probes or nGenius infiniStream, available from NetScout Systems, Inc. of Westford, Mass.

The network 110 may include a cellular network, a local area network (LAN), a wide area network (WAN) (e.g., the Internet) and/or any other interconnected data path across which multiple devices may communicate. The network 110 may include various network devices operating at different levels of protocols.

Example Architecture of Manager/Network Monitor

Figure 2:
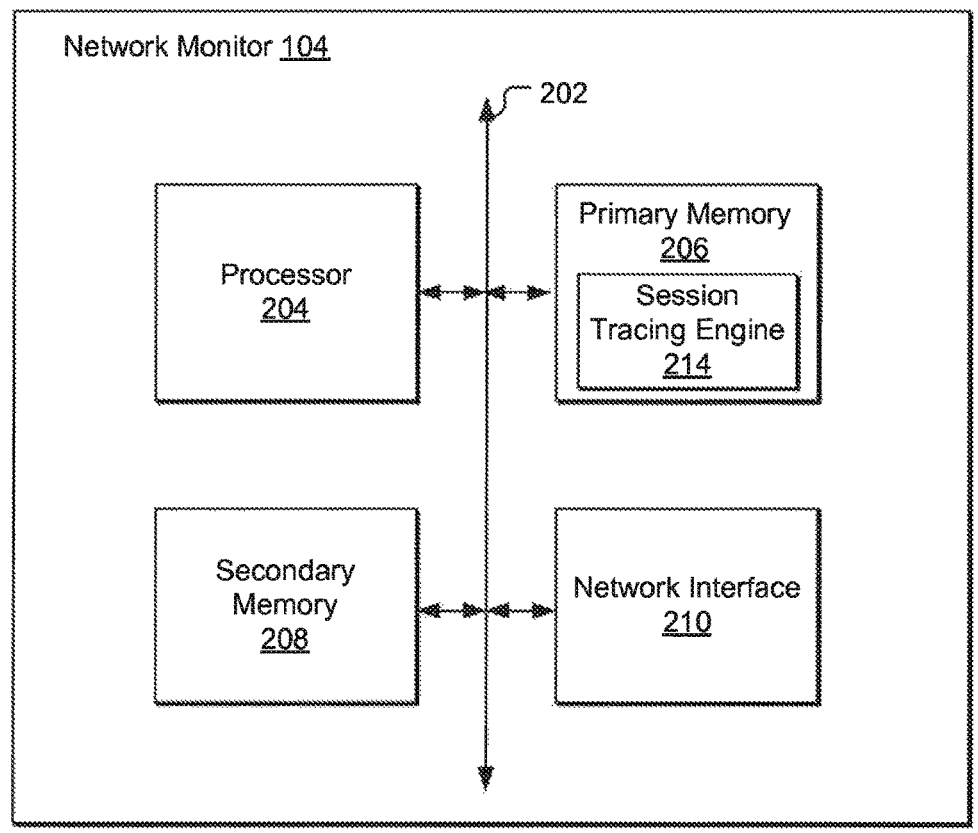
FIG. 2 is a block diagram of the network monitor in FIG. 1, according to one embodiment of the present invention.

FIG. 2 is a block diagram of the network monitor 104, according to one embodiment of the present invention. The network monitor 104 may include, among other components, a processor 204, primary memory 206, secondary memory 208, and a network interface 210. These components are connected and communicate via a bus 202. The network monitor 104 may also include other components not illustrated in FIG. 2, such as user input devices (e.g., keyboard and mouse) and display devices (e.g., a display driver card).

The processor 204 executes computer instructions stored in the primary memory 206 and/or the secondary memory 208. Although only a single processor is illustrated in FIG. 2, two or more processors may be used to increase the computing capacity and the processing speed of the network monitor 104.

The primary memory 206 is a computer readable storage medium that stores, among other data, computer instruction modules for processing, storing and retrieving network data packets and/or ASRs. The primary memory 206 may include, among other components, session tracing engine 214, as described below in detail with reference to FIG. 3. The primary memory 206 may be implemented in various data storage devices (e.g., Random-Access Memory (RAM)) having a faster access speed compared to the secondary memory 208. The faster access speed of the primary memory 206 allows the session tracing engine 214 to analyze network data packets and generate ASRs in real-time or near real-time.

The secondary memory 208 may be a secondary storage device for storing, among others, the processed ASRs and the network data packets. The secondary memory 208 may be embodied, for example, as a solid-state drive, hard disk or other memory devices capable of storing a large amount of data compared to the primary memory 206. Both the network data packets and the ASRs may be stored and then deleted on a first-in-first-out (FIFO) basis, although the ASRs may be retained for a longer time compared to the network data packets.

The network interface 210 may include a NIC (network interface card) or other standard network interfaces to receive network data packets, and to communicate with other network interface devices coupled to the network 110. For example, the network interface 210 may be an Ethernet interface, a WiFi (IEEE 802.11) interface, or other types of wired or wireless network interfaces. In one embodiment, two or more network interfaces are used to communicate with different types of networks or perform specialized functions.

In one embodiment, the network interface 210 sends the network data packets directly to the session tracing engine 214. The network interface 210 may send one set of the network data packets to the session tracing engine 214 for processing the ASRs and another set of the network data packets for storing in the secondary memory 208. Alternatively, the network interface 210 may send the network data packets to the session tracing engine 214 and not to the secondary memory 208. That is, the session tracing engine 214 receives the network data packets from the network interface 210, generates the ASRs, and sends the network data packets to the secondary memory 208. By receiving the network data packets directly from the network interface 210, the session tracing engine 214 can process the network data packets at a high speed without delays associated with accessing the secondary memory 208.

Although FIG. 2 describes the network monitor 104 as including the session tracing engine 214, the manager 102 or the correlator 106 may also include the session tracing engine 214 or select components of the session tracing engine 214 to process network data packets received at the manager 102. In one embodiment, the network monitor 104 and the manager 102 both include the session tracing engine 214.

Example Session Tracing Engine

Figure 3:
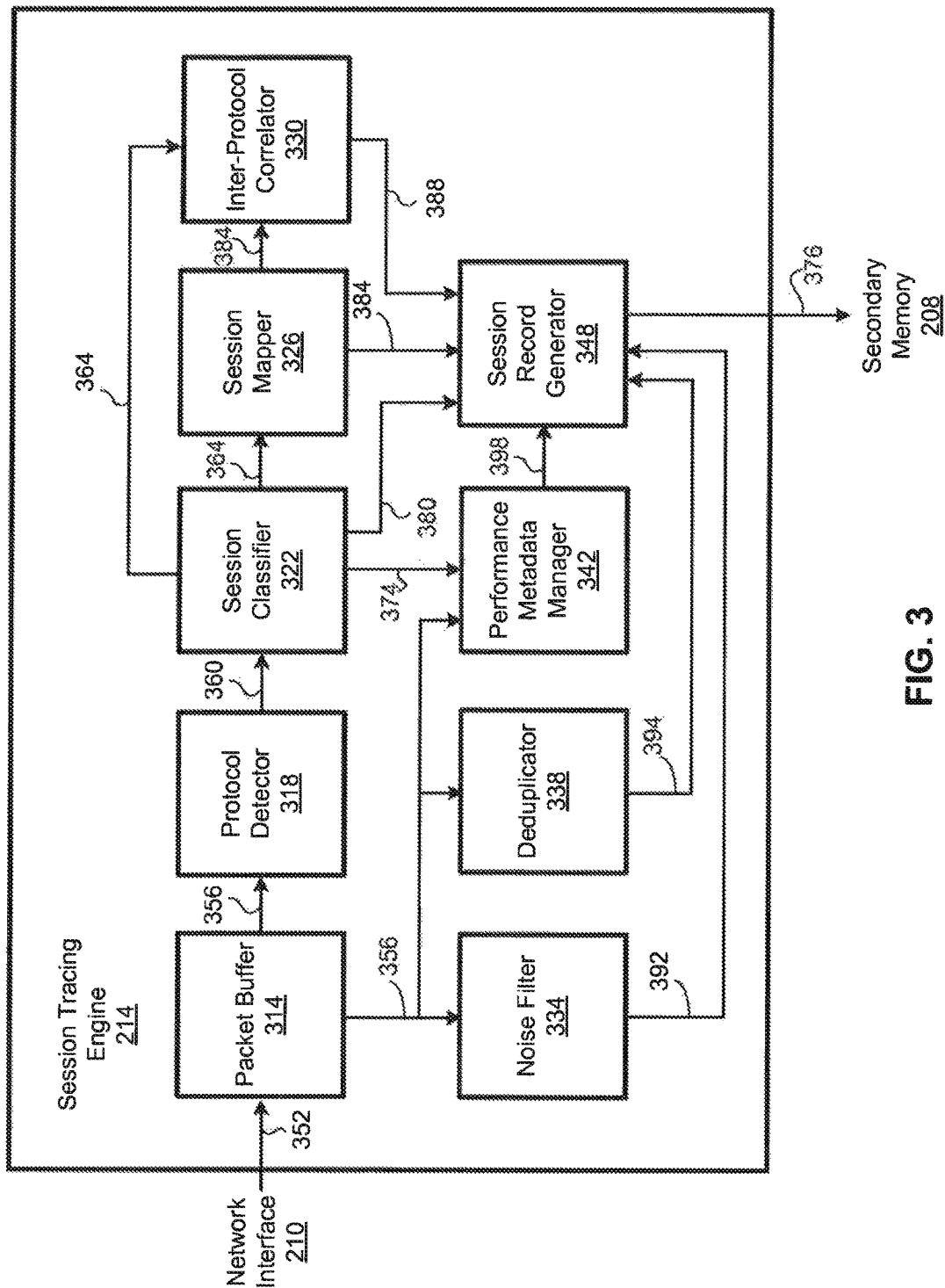
FIG. 3 is a block diagram of a session tracing engine, according to one embodiment of the present invention.

FIG. 3 is a block diagram of the session tracing engine 214, according to one embodiment of the present invention. The session tracing engine 214 may include, among other components, a packet buffer 314, a protocol detector 318, a session classifier 322, a session mapper 326, an inter-protocol correlator 330, a noise filter 334, a deduplicator 338, a performance metadata manager 342 and a session record generator 348. One or more of these components may be combined into a single module. Further, one or more of these components may be embodied as hardware or firmware in lieu of software.

The packet buffer 314 receives raw network data packets 352 from the network interface 210 and temporarily stores them for subsequent processing into the ASRs. In one embodiment, the packet buffer 314 is a first-in-first-out (FIFO) buffer. The packet buffer 314 sends buffered packets 356 to the protocol detector 318, the noise filter 334, the deduplicator 338 and the performance metadata manager 342.

The protocol detector 318 receives the buffered packets 356 and determines communication protocols associated with the buffered packets 356. In one embodiment, the protocol detector 318 analyzes the data packets at various communication layers (e.g., application layer, session layer or transport layer of OSI (Open System Interconnection) model) to determine the protocols associated with the buffered packets 356. The protocols detected may include lower level protocols (e.g., AH, ARP, BOOTP, DHCP, DNS, ESP, GRE, ICMP, ICMPv6, IPv6, IPX, LLC, MSG, REVARP, RIP, SAP, SER, SNAP, SPX, TCP, UDP, VLAN, DIAMETER, GTP, MIP, MPEG-2, MPEG-4, RTSP, RADIUS, S1-AP and SIP) as well as higher level protocols (e.g., HTTP, SMTP, POP, IMAP, FTP, TELNET, Citrix ICA, SMPP, RTP and MMS). The protocol detector outputs protocol information 360 to the session classifier 322 for inclusion in session information 364.

The session classifier 322 assigns session identification (ID) to the buffered packets 356 based on the protocol information 360 received from the protocol detector 318. If a session ID has not yet been assigned to a session associated with a buffered packet 356, the session classifier 322 assigns a new session ID for the session and sends an initializing signal 374 to the performance metadata manager 342 instructing initialization of performance parameters for the new session.

If a session ID is already assigned to a session associated with the buffered packet 356, the session classifier 322 assigns a previously created session ID to the buffered packet 356. The session classifier 322 may keep track of multiple active sessions for which the last data packet was not received. In one embodiment, the same session ID is assigned to a first packet of a session, a last packet of the session and any intermediate packets of the session. In another embodiment, the session ID is created but not assigned to any data packets or assigned only to the first packet of the session. The session classifier 322 sends session information 364 to the session mapper 326 and the inter-protocol correlator 330.

The session information 364 may indicate, for example, the session ID, the protocol associated with the session, and applications associated with the session. The session information 364 may be provided to the noise filter 334 and the deduplicator 338 to process the buffered packets 356 based on the characteristics of the session. For example, the noise filter 334 or the deduplicator 338 may select information for inclusion in an ASR based on the protocols associated with a session.

The session mapper 326 determines associated sessions of the same protocol based on the session information 364. Some protocols may involve multiple sessions in different planes or layers of communication. For example, a protocol based on ATM (Asynchronous Transfer Mode) reference model employs a user plane and a control plane, each plane having its own sessions to effectuate data transmission. The user plane is used for transmitting user information along with associated controls while the control plane is used for session control. The session mapper 326 keeps track of sessions in different planes (or layers) and generates intra-protocol mapping information 326 mapping these sessions to each other.

The session mapper 326 may also keep track of sessions of the same protocol in the same plane or layer. For example, if a first session for transmitting data was terminated due to an error and a second session was started to resume transmission for the same data, the session mapper 326 may generate intra-protocol mapping information 326 mapping the second session to the first session or vice versa. The intra-protocol mapping information 326 may be included in the ASR. The intra-protocol mapping information 326 facilitates operations that require processing across multiple related sessions by allowing the related session to be identified from the ASR.

The inter-protocol correlator 330 maps sessions of different protocols based on one or more of the session information 364 and the intra-protocol mapping information 326. The inter-protocol correlator 330 may identify and map sessions of different protocols based on various criteria such as, users, geographic regions or locations, types of end-point devices certain types of cell phones), codec, identity of end-point devices (e.g., MSISDN number or phone number) or types of services (e.g., media streaming service, voice communications service, stock trading service, and web application service). The extent and criteria of mapping the sessions may be configured by a user or determined automatically based on an automatic algorithm. In one embodiment, the configuration related to the extent and criteria for mapping different sessions is received from a user and propagated by the manager 102 to the network monitors 104.

In one embodiment, the inter-protocol correlator 330 receives session information or ASRs from the manager 102 or other network monitors 104 for mapping sessions of data packets traversing at different links or locations of the network 110. In another embodiment, the inter-protocol correlator 330 or modules performing equivalent functions may be included in the manager 102, the correlator 106 or other components for monitoring the network 110. The computing device including the inter-protocol correlator 330 or equivalent modules may perform other functions or be dedicated to correlating the ASRs and session information. The ASRs may be generated in real-time at the network monitors 104 or stored and sent to the network monitors 104 at a subsequent time.

In one embodiment, the inter-protocol correlator 330 generates inter-protocol mapping information 388 in real-time for inclusion in the ASRs 376. Alternatively, the inter-protocol correlator 330 generates correlation and mapping of the sessions after the ASRs 376 are created. That is, the ASRs 376 previously created by the session record generator 348 are updated with inter-protocol mapping information 388.

The inter-protocol mapping information 330 advantageously facilitates operations that require processing of sessions in different protocols. Various types of useful information may be derived by processing the ASRs based on the inter-protocol mapping information 330 such as evaluating the overall quality of services involving multiple protocols, and detecting issues that span across multiple protocols.

In one embodiment, the inter-protocol correlator 330 uses technology disclosed, for example, in U.S. patent application Ser. No. 10/043,501, entitled "Multi-Segment Network Application Monitoring and Correlation Architecture," filed on Jan. 10, 2002, which is incorporated by reference herein in its entirety.

Figure 4:
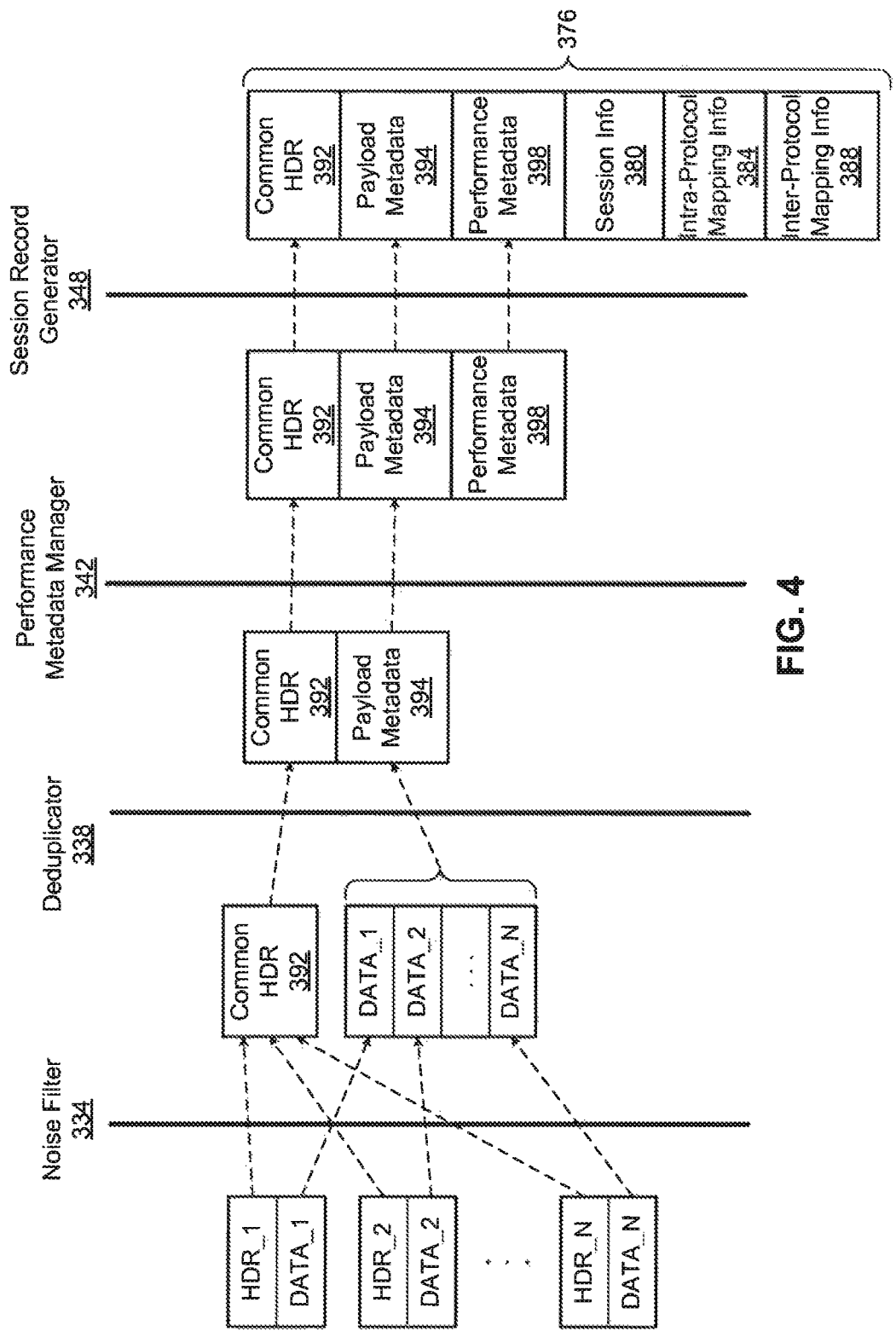
FIG. 4 is a diagram illustrating processing of data packets at various components of the session tracing engine, according to one embodiment of the present invention.

FIG. 4 is a diagram illustrating the processing of network data packets at components of the session tracing engine, according to one embodiment of the present invention. As the network data packets of a session passes through the noise filter 334 and deduplicator 338, the size of the data is reduced significantly by removing redundant and irrelevant information. Further, the performance metadata manager 324 and the session record generator 348 add addition information in the ASRs 376 useful for various operations.

The noise filter 334 selects relevant information from the headers HDR through HDR_N of the buffered packets 356, merges the relevant information and generates a common header 392 for multiple network data packets of a session. In many protocols, the headers of the network data packets include static data that remain unchanged throughout the session. In one embodiment, the noise filter 334 stores the static data in the common header 392 but excludes other non-static data. By removing non-static data, the noise filter 334 creates a compact common header 392 without redundant information or with minimal redundant information.

In one embodiment, the noise filter 334 identifies a subset of information available from the headers HDR_1 through HDR_N for storing in the common header 392. The information to be stored in the common header 392 may be configured by a user or an automatic algorithm. In one embodiment, the configuration for the common header 392 is received at the manager 102 and propagated to the network monitors 104.

The information stored in the common header 392 may include, but are not limited to, MAC (Media Access Control) addresses, source/destination IP addresses, identification of application associated with the network data packets, session numbers, port numbers, VLAN (Virtual LAN) IDs, Session IDs, and MPLS (Multiprotocol Label Switching) labels.

In one embodiment, the noise filter 334 summarizes any non-static data that change in network data packets of the same session, for example, by data field filtering, data compression, hashing or data extraction. The summarized non-static data are then stored in the common header 392. The reduction of data achieved by creating a common header can be significant, especially when the number of the network data packets in a session is large.

In one embodiment, the noise filter 334 processes the buffered data packets 356 based on the session information 364 received from the session classifier 322. Information relevant for analyzing network data packets may differ based on, for example, associated protocols, associated application programs or other characteristics of the session. By adaptively storing different subsets of information in the common header 392 based on the session information 364, the ASRs 376 remain relevant for sessions in different protocols.

The deduplicator 338 creates payload metadata 394 summarizing data payloads DATA_1 through DATA_N of data packets in a session. The payload metadata 394 stores a subset of information available from the data payloads DATA_1 through DATA_N. The subset of information stored in the payload metadata 394 may differ based on associated protocols, associated application programs or other characteristics of the session.

The information stored in the payload metadata 394 may include, but is not limited to, the size of transmitted file, file names, error codes (e.g., TCP error codes), user information associated with the session (e.g., phone number or IP address), URL (Uniform. Resource Locator), MSISDN (Mobile Subscriber ISDN Number), IMSI (International Mobile Subscriber Identity), IMEI (International Mobile Equipment Identity), cell tower information, APN (Access Point Name) and codec.

In one embodiment, the deduplicator 338 processes the buffered packets 356 depending on the session information 364. Further, the deduplicator 338 may process the buffered packets 356 depending on various other factors not defined in the session information 64 such as users, number of hops, the size of data packets and sequence numbers.

The deduplicator 338 advantageously reduces the size of payload information included in an ASR by removing a large bulk of information in each network data packet. In typical applications, the payload metadata 394 has a very small size compared to the total size of the data payloads DATA_1 through DATA_N, thereby resulting in a huge size reduction in ASRs. Yet, the payload metadata 394 retains information relevant to analysis, evaluation or troubleshooting of the network 110.

The performance metadata manager 342 generates one or more performance parameters for a session of network data packets. The performance parameters are assembled into performance metadata 398, and then sent to the session record generator 348. In one embodiment, the performance metadata manager 342 initializes the performance parameters for a session in response to receiving the initializing signal 374 from the session classifier 322. The initializing signal 374 indicates that a new session of network data packets is detected. Then the performance metadata manager 342 updates the initialized performance parameters as data packets for the new session are received from the packet buffer 314. The performance parameters for the session are finalized after receiving the last data packet of the session and assembled into the performance metadata 398.

The performance parameters included in the performance metadata 398 may vary depending upon the application. Applications may include, among others, mobile communication applications, remote data services applications (e.g., internet hosting applications), financial applications (e.g., securities transaction applications) and database applications (e.g., database access and management). The performance metadata applicable to various types of applications may include, but are not limited to, a packet loss rate, response time, the number of packets or bytes transmitted, parameters indicative of transmission latency, the total transfer time, the number of packets or bytes transmitted, sender/receiver information, error codes, service types and a total transfer time for the session. The performance metadata applicable to mobile communication application include, but are not limited to, codec parameters, R-Factor (rating factor), MOS (Mean Opinion Score), user ID, jitter, phone number, and connection success rate. The performance metadata applicable to remote data services application include, but are not limited to, file or page size, file names, and operation codes (e.g., read data operation, query data operation and write data operation). The performance metadata applicable to financial application include, but are not limited to, stock symbols, timing of sale, type of transaction (e.g., sell or buy), success or failure of transaction, number of shares exchanged, identification of stock exchange (e.g., NYSE and NASDAQ) and customer order identification. The performance metadata applicable to database application include, but are not limited to, transaction type (e.g., update, delete or create a table), attributes, success or failure of transaction, identification of database table, and entry access type (e.g., delete, update or create an entry in a table).

In one embodiment, the performance parameters included in the performance metadata 398 are adjusted based on the session information 364. Since different types of sessions may involve different performance parameters to assess the performance of the network 110 or services, the performance metadata manager 342 adaptively computes and adds different performance parameters to the performance metadata 398 according to the session information 398. The performance parameters to be included in each type of session may be configured manually or by an automatic algorithm at the manager 102 and propagated to the network monitors 104.

In one embodiment, the performance metadata manager 342 receives data processed by the noise filter 392, the deduplicator 394 or other components of the session tracing engine 214 in lieu of or in addition to the buffered packets 356 to generate the performance metadata 398. For example, the common header 392 as processed by the noise filter 334 may include performance parameters. The performance metadata manager 342 can receive the already processed performance parameters from the common header 392 instead of repeating the computation of the processed performance parameters.

The session record generator 348 collects information from other components of the session tracing engine 214 and generates an ASR 376 for a session. Each ASR 376 summarizes information extracted from a plurality of network data packets in the same session.

In one embodiment, the ASR 376 includes the common header 392, the payload metadata 394, the performance metadata 398, the session information 380, the intra-protocol mapping information 384 and the inter-protocol mapping information 388 (see FIG. 4). After the last network data packet for the session is received, the session record generator 348 receives the common header 392, payload metadata 394, and the performance metadata 398 front the noise filter 334, the deduplicator 338 and the performance metadata manager 342, respectively. The session record generator 348 also receives the session information 380, the intra-protocol mapping information 384 and the inter-protocol mapping information 388 from the session classifier 322, the session mapper 326 and the inter-protocol correlator 330, respectively.

The session record generator 348 formats the received information into an ASR 376 and stores the ASR 376 in the secondary memory 208. The session record generator 348 may format the received information according to a template configured for each protocol.

In one embodiment, the ASR 376 is also sent to the manager 102 or other network monitors 104 for correlating sessions detected at different locations of the network 110.

In one embodiment, the session record generator 348 also adds links (not shown) to the entire network data packets of the session in the ASR 376. By including the links, the network data packets associated with the ASR 376 may be traced conveniently for troubleshooting, analysis or evaluation in case investigation into individual network data packets is desired. In another embodiment, the ASR 376 may also include links to a subset of network data packets associated with the session. The subset of network data packets preferably includes important network data packets such as the first packet of the session, the last packet of the session and the packets including errors.

The processing of network data packets as illustrated in FIG. 4 is merely illustrative. The network data packets may be processed in a different sequence or manner from what is described in FIG. 4. For example, the payload metadata 394 may be processed before the common header 392. Similarly, the performance metadata 398 may be processed before the payload metadata 394 and/or the common header 392. Further, the common header 392, the payload metadata 394 and the performance metadata 398 may be processed in parallel.

Process of Generating Adaptive Session Record

Figure 5A:
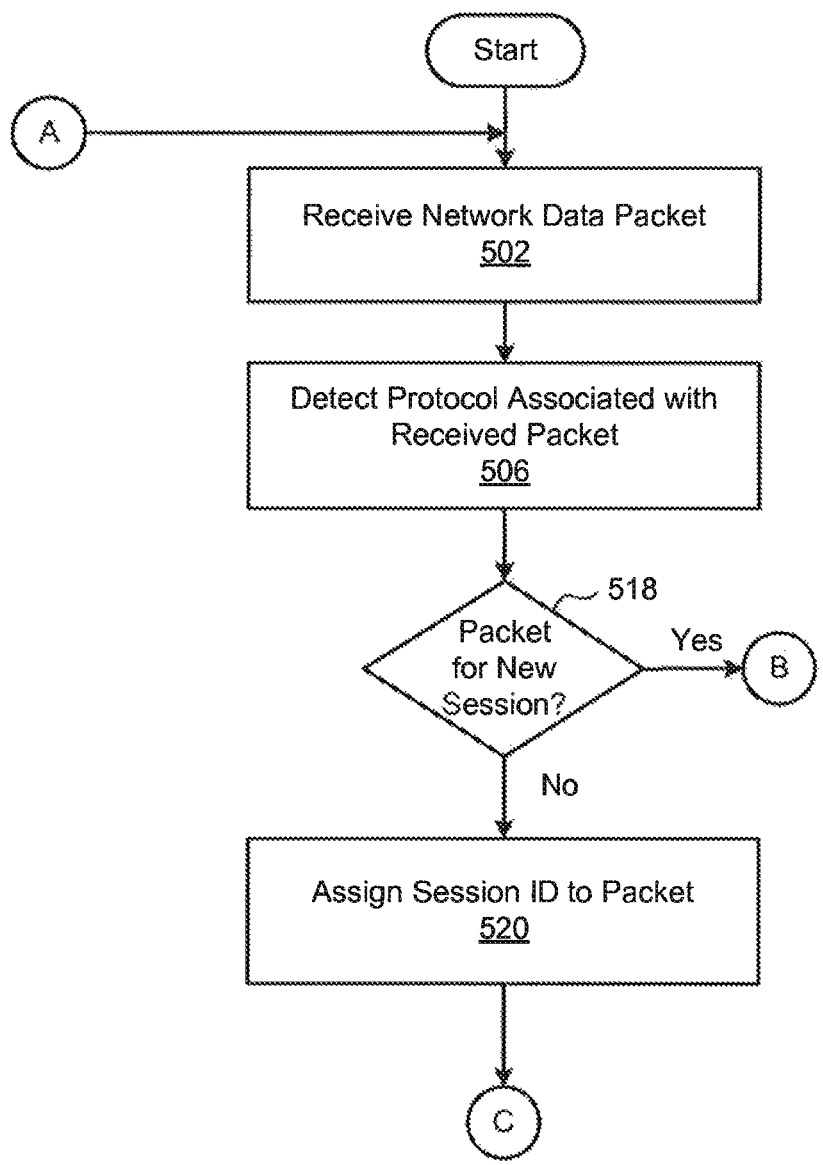
FIGS. 5A through 5C are flowcharts illustrating a method of generating an adaptive session record (ASR), according to one embodiment of the present invention.
Figure 5B:
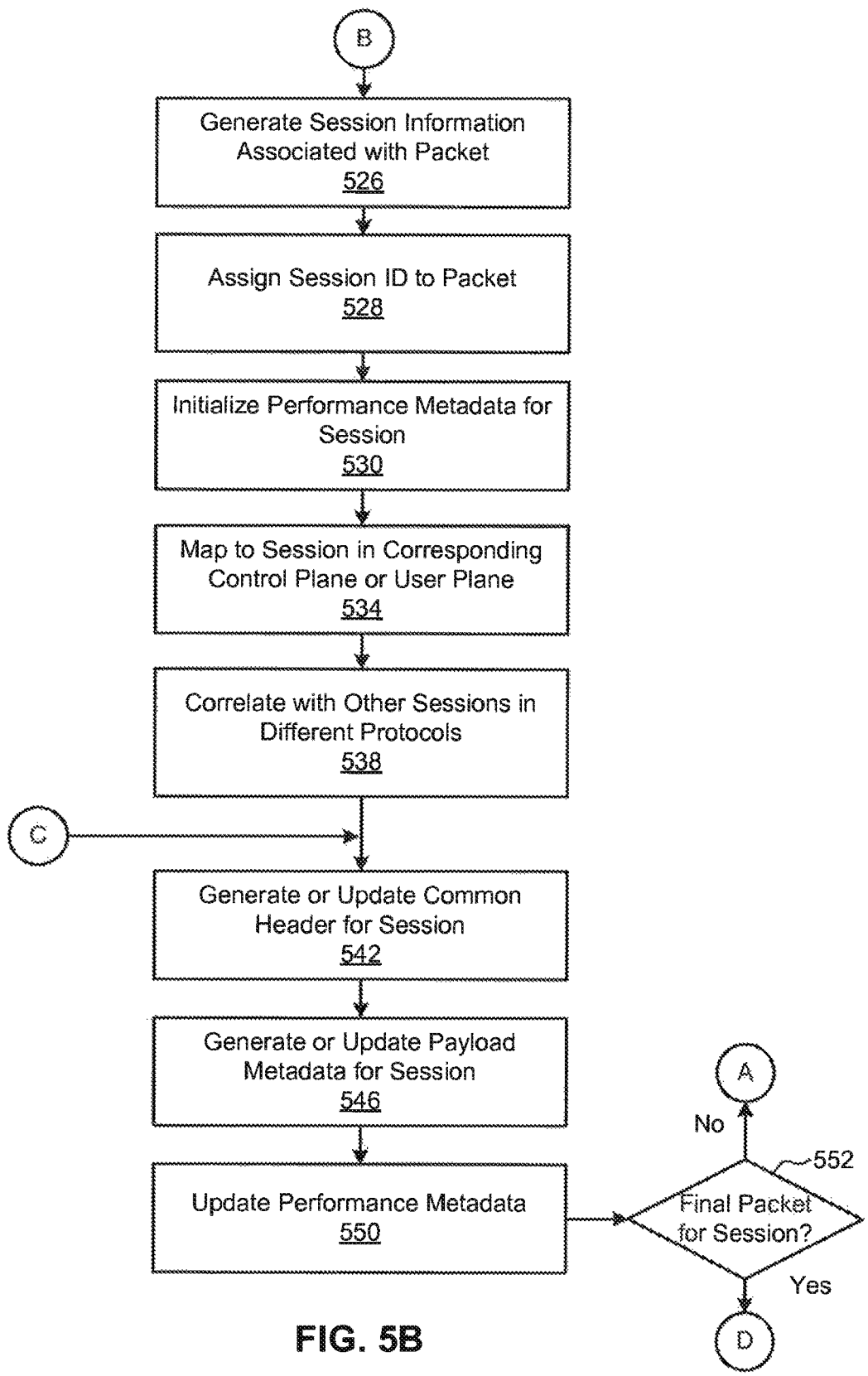
Figure 5C:
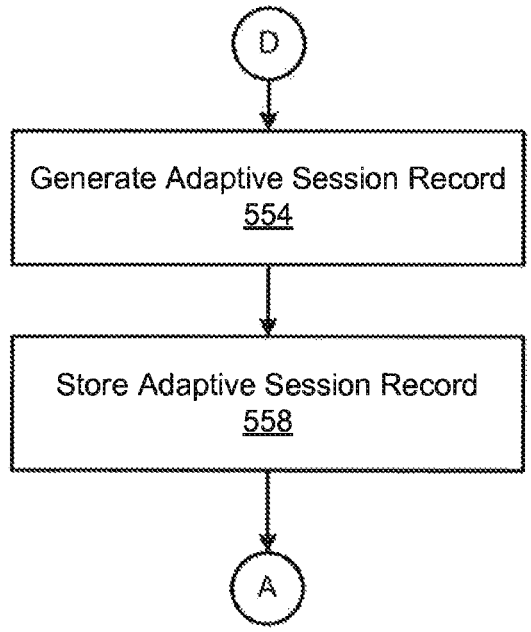

FIGS. 5A through 5C are flowcharts illustrating a method of generating an ASR 376, according to one embodiment of the present invention. The session tracing engine 214 receives 502 the raw network data packets 352 from the network interface 210 and stores the raw network data packets 314 in the packet buffer 314. The protocol detector 318 receives the buffered packets 356 from the packet buffer 314 and detects 506 a protocol associated with the buffered packets 356.

It is then determined 518 whether the buffered packet 356 is for a new session. If the buffered packet 356 is for a new session, then the process proceeds to the steps of FIG. 5B, as indicated by circle "B" in FIG. 5A. Conversely, if the buffered packet 356 is for a preexisting session that is currently being tracked by the session classifier 332, the session classifier 322 assigns 520 a corresponding session ID to the buffered packet 356. Then the process proceeds to the steps in FIG. 5B, as indicated by circle "C" in FIG. 5A.

As illustrated in FIG. 5B, if the session associated with the current data packet is a new session, then the session classifier 322 generates 526 session information 364 associated with the buffered packet 356. The session classifier 322 also assigns 528 a new session ID to the buffered packet 356.

The performance metadata manager 342 receives the initialization signal 374 from the session classifier 322 and initializes 530 the performance metadata for the new session. The session mapper 326 also maps 534 different sessions of the same protocol (e.g., control plane and user planes) and generates the intra-protocol mapping information 384.

The inter-protocol correlator 330 also correlates 538 other sessions communicating over different protocols based on a manual configuration or an automatic algorithm. To correlate different sessions, the inter-protocol correlator 330 may receive session information, ASRs or other information from the manager 102 or other network monitors 104.

Regardless of whether the buffered packets 356 are associated with a new session or a preexisting session, the noise filter 334 processes the buffered packets 356 of the same session to generate or update 542 a common header 392 for the session.

The deduplicator 338 also processes the buffered packets 356 of the same session to generate or update 546 the payload metadata 394 for the session. The performance metadata manager 342 updates 550 the performance metadata 398 as additional network data packets of the same session are received.

Then it is determined 552 whether the processed data packet 356 is the last data packet of the session. If the processed data packet 356 is the last data packet in the session, the process proceeds to steps in FIG. 5C, as indicated by circle "D" in FIG. 5B. Specifically, as illustrated in FIG. 5C, the session record generator 348 generates 554 the ASR 376 based on information received from other components of the session tracing engine 214, and stores 558 the generated ASR 376 in the secondary memory 208. Then the process returns to step 502 of receiving a new data packet 356 and repeats the subsequent steps, as indicated by circle "A" in FIG. 5C.

In one embodiment, the updated common header, the updated payload metadata and the performance metadata are made available even before a final data packet for the session is received. A session may persist for an extensive amount of time. If an analysis, correlation or other processing needs to be performed before a finalized ASR is available, the common header, the payload metadata and the performance metadata currently available, for example, can be provided via the manager 102. For this purpose, the manager 102 may request the network monitors 104 to provide a temporary AST including common header, payload metadata, and performance metadata obtained from data packets received up to current time to the manager 102.

If the buffered data packet 356 is not the last data packet of the session, the process returns to step 502 of receiving new network data packets 356 and repeats the subsequent steps, as indicated by circle "A" in FIG. 5B.

The process illustrated in FIGS. 5A through 5C is merely illustrative; and various modifications may be made to the process illustrated in these figures. For example, steps 520 and 528 of assigning the session ID may be performed in parallel with step 542 of generating or updating the common header, or step 546 of generating or updating the payload metadata. The sequence of steps illustrated in FIGS. 5A through 5C may also be modified. For example, sequence of steps 542 and 546 may be reversed.

Network Analysis Based on Adaptive Session Record

The ASRs stored in the secondary memory 208 are retrieved to perform various operations such as analyzing the cause of events, troubleshooting the network 110 or evaluating the performance or conditions of the network 110. The ASRs are sufficient for most operations because the ASRs are configured to include information relevant to these operations. By using the ASRs, retrieval and analysis of network data packets become unnecessary or infrequent.

The ASRs also take up much less memory space and are compact compared to the network data packets. Hence, the ASRs allow more efficient use of storage resources in the network monitoring system 100. Further, minimal or no additional processing needs to be performed on the ASRs to extract performance parameters or data relevant for various operations. Therefore, the network monitoring system 100 can perform various operations based on the ASRs more efficiently compared to performing these operations based on the network data packets.

The operations that can be performed based on the ASRs may include, but are not limited to: (i) determining the amount of data usage of a particular user, (ii) detecting network error events often encountered for certain types of end-point devices, (iii) identifying circumstances in which errors in an application or a network occur, (iv) network performance for different types of services, (v) network equipments that often cause errors in the network, (vi) detecting security threats, (vii) measuring user experiences (e.g., success/failure rate, voice quality, video quality, and response time), (viii) market intelligence, (ix) data mining and (x) user billing associated with use of the network.

In one embodiment, the ASR of a session includes links or identifications of network data packets associated with the session. Hence, the network monitoring system 100 may retrieve and analyze individual network data packets, if needed, based on the links or identifications in the ASRs.

In one embodiment, the links or identifications of the network data packets for a session is stored in a file separate from the ASR. When the ASRs matching the search condition are identified 616, the separate file is searched to identify the network data packets relevant to the search condition. By moving the links or identifications of the network data packets to the separate file, the size of the ASR may be reduced.

Figure 6:
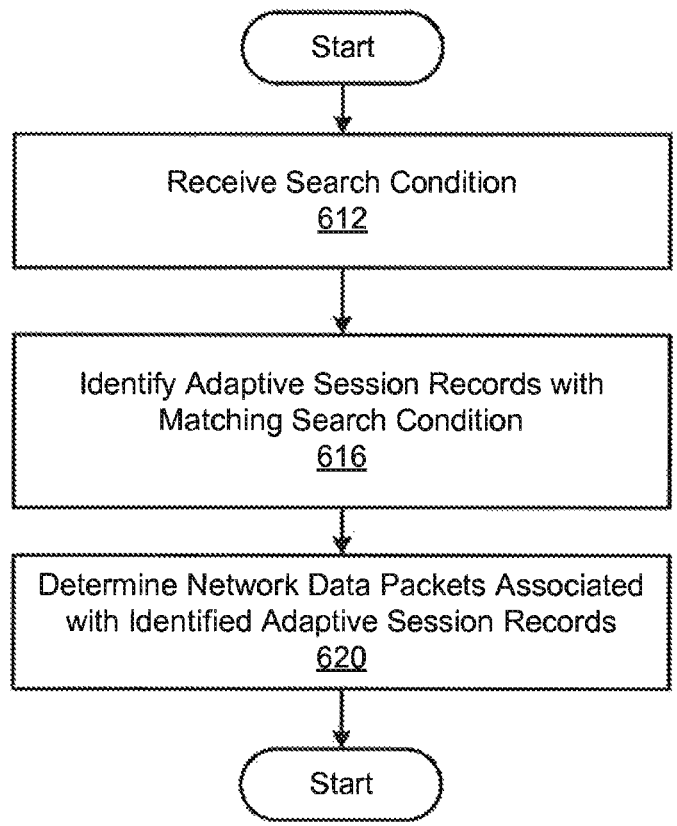
FIG. 6 is a flowchart illustrating a method of identifying stored network data packets for analysis using ASRs, according to one embodiment of the present invention.

FIG. 6 is a flowchart illustrating a method of identifying network data packets for analysis based on an ASR, according to one embodiment of the present invention. A search condition for identifying relevant sessions and; or network data packets is received 612. The ASRs that match the search condition are then identified 616 by analyzing various fields of the ASRs.

After identifying the relevant ASRs, the network data packets associated with the ASRs are determined 620 based on links to identifications of network data packets.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A method, comprising:
   determining first and second sessions associated with data packets received by a network monitoring device at a location in a network;
   generating a common header summarizing information in headers of a plurality of data packets in each of the first and second sessions by the network monitoring device; and
   generating, for each first and second session, a session record for respectively storing the common header of the first and second session, and storing mapping information representing association of the first session with the second session when the first and second sessions are associated with planes in a same protocol.

2. The method as recited in claim 1, further including generating a unit of payload metadata summarizing information in payloads of the plurality of the data packets in each of the first and second session by the network monitoring device wherein the generating step further includes storing the payload metadata of each of the first and second session respectively in the session record for each first and second session.

3. The method of claim 2, further comprising determining a protocol associated with each of the first and second session, information included in the common header or the payload metadata of each first and second session is respectively determined based on a protocol associated with the first and second session.

4. The method of claim 2, wherein the common header and the payload metadata are generated in real-time responsive to receiving data packets for each of the first and second session from the network.

5. The method of claim 1, further comprising:
   generating performance parameters representing performance of the network for transmitting the plurality of the data packets in each of the first and second sessions; and
   adding the performance parameters of the first and second sessions respectively in the first and second session record.

6. The method of claim 5, wherein the performance parameters comprise at least one of a packet loss rate, a response time, a number of packets or bytes transmitted, parameters indicative of transmission latency, codec parameters, total transfer time for the session, R-Factor (rating factor), MOS (Mean Opinion Score), a file or page size, a file name, sender/receive information, a total transfer time, a user ID, jitter, and phone number.

7. The method of claim 1, wherein the first session is associated with a first protocol and the second session is associated with a second protocol different than the first protocol.

8. The method of claim 1, wherein each first and second session record further stores links to the plurality of the data packets respectively in each of the first and second sessions.

9. The method of claim 1, wherein the common header comprises fields of the headers that remain unchanged throughout each respective first and second session.

10. A network monitoring device for processing network data for analysis, comprising:
    a network interface configured to receive data packets at a location in a network; and
    a session tracing engine configured to:
        determine first and second sessions associated with data packets received by a network monitoring device at a location in a network;
        generate a common header summarizing information in headers of a plurality of data packets in each of the first and second sessions by the network monitoring device; and
        generate, for each first and second session, a session record for respectively storing the common header of the first and second session, and storing mapping information representing association of the first session with the second session when the first and second sessions are associated with planes in a same protocol.

11. The network monitoring device as recited in claim 10, wherein the session tracing engine is further configured to generate a unit of payload metadata summarizing information in payloads of the plurality of the data packets in each of the first and second session by the network monitoring device wherein the generating step further includes storing the payload metadata of each of the first and second session respectively in the session record for each first and second session.

12. The network monitoring device as recited in claim 11, wherein the session tracing engine is further configured to determine a protocol associated with each of the first and second session, information included in the common header or the payload metadata of each first and second session is respectively determined based on a protocol associated with the first and second session.

13. The network monitoring device as recited in claim 11, wherein the common header and the payload metadata are generated in real-time responsive to receiving data packets for each of the first and second session from the network.

14. The network monitoring device as recited in claim 11, wherein each first and second session record further stores links to the plurality of the data packets respectively in each of the first and second sessions.

15. The network monitoring device as recited in claim 10, wherein the session tracing engine is further configured to:
    generate performance parameters representing performance of the network for transmitting the plurality of the data packets in each of the first and second sessions; and
    add the performance parameters of the first and second sessions respectively in the first and second session record.

16. The network monitoring device as recited in claim 15, wherein the performance parameters comprise at least one of a packet loss rate, a response time, a number of packets or bytes transmitted, parameters indicative of transmission latency, codec parameters, total transfer time for the session, R-Factor (rating factor), MOS (Mean Opinion Score), a file or page size, a file name, sender/receive information, a total transfer time, a user ID, jitter, and phone number.

17. The network monitoring device as recited in claim 10, wherein the first session is associated with a first protocol and the second session is associated with a second protocol different than the first protocol.

18. The network monitoring device as recited in claim 10, wherein the common header comprises fields of the headers that remain unchanged throughout each respective first and second session.

* * * * *